US011268001B2

(12) United States Patent
Lontchar et al.

(10) Patent No.: US 11,268,001 B2
(45) Date of Patent: *Mar. 8, 2022

(54) MOISTURE CURABLE ADHESIVE COMPOSITION AND METHOD FOR INSTALLING HARDWOOD FLOORS

(71) Applicant: Bostik, Inc., Wauwatosa, WI (US)

(72) Inventors: Michael S. Lontchar, New Hope, PA (US); Michael A. Chronister, Norristown, PA (US); Kristin J. Ryan, Prospect Park, PA (US)

(73) Assignee: Bostik, Inc., Wauwatosa, WI (US)

( * ) Notice: Subject to any disclaimer, the term of this patent is extended or adjusted under 35 U.S.C. 154(b) by 231 days.

This patent is subject to a terminal disclaimer.

(21) Appl. No.: 15/958,126

(22) Filed: Apr. 20, 2018

(65) Prior Publication Data

US 2018/0237670 A1    Aug. 23, 2018

Related U.S. Application Data

(63) Continuation of application No. 12/982,306, filed on Dec. 30, 2010, now Pat. No. 10,017,674.

(60) Provisional application No. 61/291,513, filed on Dec. 31, 2009.

(51) Int. Cl.
| | | |
|---|---|---|
| *C09J 175/04* | (2006.01) | |
| *C08G 18/48* | (2006.01) | |
| *C08G 18/76* | (2006.01) | |
| *C08G 65/336* | (2006.01) | |
| *C09J 171/00* | (2006.01) | |
| *C09J 171/02* | (2006.01) | |
| *C09J 175/08* | (2006.01) | |
| *E04F 21/20* | (2006.01) | |
| *E04F 21/16* | (2006.01) | |
| *E04F 15/02* | (2006.01) | |
| *C08K 7/00* | (2006.01) | |
| *E04F 15/04* | (2006.01) | |

(52) U.S. Cl.
CPC ........ *C09J 175/04* (2013.01); *C08G 18/4825* (2013.01); *C08G 18/4829* (2013.01); *C08G 18/7671* (2013.01); *C08G 65/336* (2013.01); *C09J 171/00* (2013.01); *C09J 171/02* (2013.01); *C09J 175/08* (2013.01); *E04F 15/02155* (2013.01); *E04F 21/162* (2013.01); *E04F 21/20* (2013.01); *C08K 7/00* (2013.01); *E04F 15/04* (2013.01); *Y10T 428/25* (2015.01)

(58) Field of Classification Search
CPC ...... C09J 175/04; C09J 171/00; C09J 171/02; C09J 175/08; C08G 18/4825; C08G 18/4829; C08G 18/7671; C08G 65/336; C08K 7/00; E04F 21/20; E04F 21/162; E04F 15/02155; E04F 15/04; Y10T 428/25

See application file for complete search history.

(56) References Cited

U.S. PATENT DOCUMENTS

| 4,783,366 A * | 11/1988 | Shimogo ................. C08L 21/00 427/422 |
|---|---|---|
| 5,905,133 A | 5/1999 | Muller et al. |
| 7,029,744 B2 * | 4/2006 | Horstman ............... B32B 25/08 428/143 |
| 7,259,190 B2 | 8/2007 | Lykke |
| 7,282,264 B2 | 10/2007 | Ddamulira et al. |
| 8,415,444 B2 | 4/2013 | Yano et al. |
| 10,017,674 B2 * | 7/2018 | Lontchar ................. E04F 21/20 |
| 2003/0073765 A1 * | 4/2003 | Ddamulire ............... C08K 5/01 524/115 |
| 2004/0113483 A1 | 6/2004 | Sylvester et al. |
| 2004/0181025 A1 | 9/2004 | Schindler et al. |
| 2005/0113499 A1 | 5/2005 | Tamcke et al. |
| 2005/0119421 A1 | 6/2005 | Schindler et al. |
| 2009/0044364 A1 * | 2/2009 | Verscheure ............. E04F 21/02 15/245.1 |
| 2009/0198036 A1 | 8/2009 | Duffy et al. |
| 2010/0004367 A1 * | 1/2010 | Yano .................. C08G 65/2609 524/377 |
| 2010/0059164 A1 | 3/2010 | Hughett et al. |

FOREIGN PATENT DOCUMENTS

| EP | 0931800 | 7/1999 |
|---|---|---|
| FR | 2787116 | 6/2000 |
| JP | S62-013649 | 9/1987 |
| JP | 1290873 A | 11/1989 |
| JP | 5005356 A | 1/1993 |
| JP | 7034639 A | 2/1995 |
| JP | 8144484 A | 6/1996 |
| JP | 11302621 A | 11/1999 |
| JP | H06-078506 | 11/1999 |
| JP | 2000001924 | 1/2000 |
| JP | 2000001924 A | 1/2000 |

(Continued)

OTHER PUBLICATIONS

Machine English translation of FR 2787116, De Vriendt, Jun. 16, 2000.*

(Continued)

*Primary Examiner* — Patrick D Niland
(74) *Attorney, Agent, or Firm* — Christopher R. Lewis

(57) ABSTRACT

An adhesive composition for adhesively bonding floor coverings to a variety of substrates. The composition includes 0.2 to 10 weight percent of a plurality of irregularly shaped spacer particles of size 0.5 mm to 10 mm; 10 to 50 weight percent of a moisture curable polymer system; and 40 to 90 weight percent of additives for modifying physical properties of the composition. The adhesive has a composition such that, when cured, results in an elastomeric film of uniform thickness that exhibits controlled moisture vapor transmission and sound abatement properties. A floor structure and a method for constructing the floor structure using the adhesive composition are also provided.

15 Claims, 1 Drawing Sheet

(56) References Cited

FOREIGN PATENT DOCUMENTS

| JP | 2001089738 A | 4/2001 |
|---|---|---|
| JP | 2002-020722 | 1/2002 |
| JP | 2008285616 A | 11/2008 |
| JP | 2009-039711 | 2/2009 |
| JP | 2009024096 A | 2/2009 |
| JP | 2010275435 A | 12/2010 |
| JP | 2013-516524 | 5/2013 |
| WO | WO 2008/084651 * | 7/2008 |
| WO | 2008145458 | 12/2008 |
| WO | WO 2009/086459 | 12/2008 |

OTHER PUBLICATIONS

International Search Report and Written Opinion, PCT International Application No. PCT/US2010/062543, dated Mar. 3, 2011.
www.staufusa.com, Technical Data Sheet for SMP-960 One-Step polymer based wood flooring adhesive, 2 pgs., Jul. 28, 2011.

* cited by examiner

MOISTURE CURABLE ADHESIVE COMPOSITION AND METHOD FOR INSTALLING HARDWOOD FLOORS

CROSS-REFERENCE TO RELATED APPLICATIONS

This application is a continuation application under 35 U.S.C. § 120 of U.S. patent application Ser. No. 12/982,306, filed on Dec. 30, 2010, which claims the benefit under 35 U.S.C § 119(e) of U.S. patent application No. 61/291,513, filed on Dec. 31, 2009, the contents of which are incorporated herein by reference in its entirety.

BACKGROUND OF THE INVENTION

The invention relates generally to a one-component, moisture-curable adhesive composition with a plurality of spacer particles, and having controlled moisture vapor transmission and sound abatement properties. The adhesive composition is particularly suitable for adhesively bonding floor coverings to a variety of substrates.

A wide variety of flooring materials are available for use in residential and commercial applications. Wood floor coverings are a popular method of providing a decorative and long-lasting floor surface. However, the installation is typically a labor-intensive process that requires many steps to accomplish properly.

Wood floor coverings may be installed over a wide variety of substrates, including concrete, plywood, particle or chip board (underlayment grade), well-bonded vinyl and ceramic tile, cement backer board, gypsum patch/underlayments (dry, above grade), cement patch/underlayments, radiant-heat flooring, and terrazzo. When installed over concrete, these coverings are exposed to moisture vapor from beneath the concrete, as well as from the concrete itself. Moisture vapor acts according to the physical laws of gases and chemical equilibrium, and travels from one area to another whenever a difference of vapor pressure exists. In climate-controlled (air-conditioned) areas, such as residential dwellings, the ambient environment provides a condition where the air above a concrete substrate surface can readily absorb moisture from the earth, and therefore, tries to satisfy itself by constantly pulling moisture through the substrate, in an attempt to reach a rarely achievable condition of equilibrium.

If large enough, the moisture vapor driving force can cause the bottom of a wood floor covering adjacent to the concrete to expand (dimensional swelling caused by increasing moisture content) more than the top that is exposed to the climate-controlled environment. The end-result is called "cupping", and provides an unsightly irregular appearance to the floor surface. Additionally, these dimensional changes in the wood floor covering can cause added stress to the adhesive bonds, which can also cause bond degradation and/or fracture. The cost to replace the damaged flooring can be expensive and time consuming.

A method to address the "cupping" problem is to provide sufficient drying time for the concrete substrate to achieve an acceptable level of vapor transmission to continue with the flooring installation. However providing sufficient drying time is not as widely followed because of the time limitations faced by installers. Another method is to seal the surface of the concrete with impervious paper or plastic sheets, or to apply a membrane-forming curing compound to serve as a vapor barrier or retarder. This membrane must be a continuous layer of substantially uniform thickness, since any imperfections can provide pathways for which moisture vapor can pass. Commonly known membrane-forming curing compounds are two-part epoxy-based or water-based sealers. These sealers require premixing before application, which can result in improper mixing of the components, and therefore, job failures, or require up to several days of curing before the sealer is fit for application. Single component moisture-curing polyurethanes are another commonly used sealer, and can require cure times of half a day or more, depending on ambient conditions.

Additional information relevant to attempts to address these "cupping" problems can be found in U.S. Patent Application Publication 2009/0044364 and 2010/0059164, and in International Patent Application Publication WO 2008/145458. However, each one of these references suffers from one or more of the following disadvantages: poor adhesive flow characteristics that result in a non-uniform adhesive film thickness or less than 100% adhesive coverage on the underside of the floor covering when the flooring covering is installed; air gaps in the adhesive layer created by spacer particles in the adhesive composition, thereby creating a non-continuous film which allows for increased moisture vapor transmission; poor moisture vapor transmission control due to polymer and/or additive technology of the adhesive composition; use of specialized tools for adhesive application that need to be frequently replaced due to wear, resulting in inconsistent, non-uniform adhesive membrane thickness as the installation progresses; and, inability to regulate adhesive film thickness and prevent adhesive "squeeze out" if too much pressure is applied to the top of the floor covering during installation.

For the foregoing reasons, there exists a need for an adhesive composition that can serve the purpose of an adhesive and moisture vapor barrier with a single application of material that overcomes the shortcomings of the available products and methods.

SUMMARY OF THE INVENTION

The present invention is directed to an adhesive composition that satisfies the needs for an adhesive and moisture vapor barrier in a single application of material. The adhesive composition comprises about 10 to about 50 weight percent of a one-component moisture curable polymer system, about 0.2 to about 10 weight percent of a plurality of irregularly shaped spacer particles of size 0.5 mm to 10 mm, and about 40 to about 90 weight percent of additives for modifying physical properties of the composition. The adhesive has a composition such that, when cured, results in a continuous layer of an elastomeric film having uniform thickness, and which exhibits controlled moisture vapor transmission and sound abatement. It is believed that the composition's improved moisture vapor transmission and sound abatement properties are provided by the incorporation of the spacer particles of the herein specified size and shape which regulate the minimum thickness of the composition and enable a continuous uniform layer of adhesive to be applied.

The addition of the irregularly shaped spacer particles provides several benefits not previously simultaneously achievable when installing hardwood floors. It insures that there are no areas where the adhesive is completely squeezed out of and provides a certain minimum film thickness. It also helps prevent the boards from sliding excessively during installation which can occur with adhesives that do not have the spacers or have substantially spherical spacers.

While the flooring material being installed and the surface to which they are applied are generally flat, in fact neither of them are totally planar. This leads to areas where the adhesive is completely squeezed out and other areas where the adhesive is thicker. The areas where there is no adhesive can lead to areas of poor or no bonding, as well as spots where sound and moisture can be transmitted through the flooring. The areas where there is low or no bond strength can also provide areas where widespread delamination of the flooring can propagate. The incorporation of the irregularly shaped particles overcomes these issues and provide all these benefits over the prior art compositions.

The present invention is also directed to a floor structure, comprising a floor substrate, an adhesive composition comprising a one-component moisture curable polymer system and a plurality of spacer particles, applied to at least a portion of said floor substrate, and at least one floor covering element applied over said adhesive composition.

The present invention is further directed to a method for constructing a floor, the method comprising applying an adhesive composition comprising a one-component moisture curable polymer system and a plurality of spacer particles, to at least a portion of a surface of a floor substrate, and applying at least one floor covering element over said adhesive composition. Sufficient pressure can be applied to the top of the floor covering to cause the adhesive composition to spread uniformly between the flooring covering and substrate, and thereby, creating a continuous layer.

BRIEF DESCRIPTION OF THE DRAWING

These and other features, aspects, and advantages of the present invention become better understood with regard to the following description, appended claims, and accompanying drawings, where:

DETAILED DESCRIPTION OF THE INVENTION

Reference now is made in detail to various embodiments of the disclosure, one or more examples of which are set forth below. Each example is provided by way of explanation of the disclosure, not limitation of the disclosure. In fact, it will be apparent to those skilled in the art that various modifications and variations can be made in the present disclosure without departing from the scope or spirit of the disclosure. Thus, it is intended that the present disclosure covers such modifications and variations as come within the scope of the appended claims and their equivalents.

The present disclosure is generally directed to an adhesive composition, a floor structure, and a method for constructing a floor structure with the adhesive composition. The present inventors have discovered adhesive compositions that can be applied without special applicator tools so as to enable one-step application of an adhesive and sealer composition. Importantly, the compositions described herein can also include various other benefits when compared with traditional compositions.

The compositions, floor structures, and methods described herein provide controlled moisture vapor transmission from the subfloor and create a noise reduction barrier over the subfloor. In certain embodiments of the present disclosure, acoustical values evidencing reduction in noise transmission are greatly improved utilizing the compositions described herein. The composition described herein can replace multiple step installations of traditional acoustical systems such as cork, foam, recycled rubber, or the like, thereby reducing installation time, waste, materials, disposal expenses, and other such costs. The composition also serves as an anti-fracture membrane, which can bridge cracks that can occur in the substrate prior to or after installation, and provides anti-microbial protection to inhibit the growth of bacteria, mold, or mildew on the surface of the dried composition.

Figure 1:
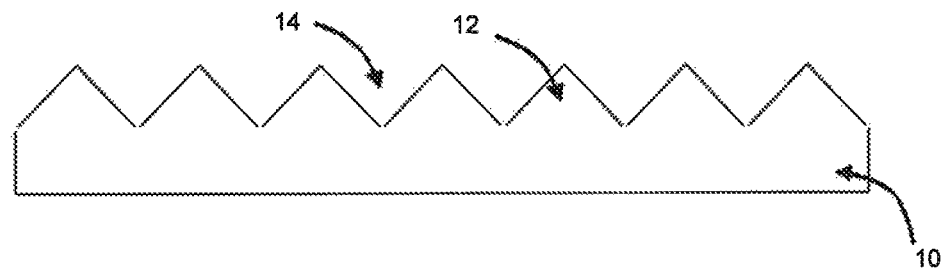
FIG. 1 illustrates a cross-sectional view of a commonly used trowel blade for applying a floor covering adhesive composition to a substrate.

Referring to FIG. 1, an example of a trowel blade 10 that is commonly used for applying flooring adhesive to a substrate is shown. Trowel blades can be of various shapes, for example, V-notch or square notch. The suggested notched trowel for maximum performance in combination with the present invention is a V-notch. The trowel blade 10 has a plurality of teeth 12 with gaps 14 between such teeth 12. The various dimensions of the trowel blade 10 and size of the teeth 12 can be of any suitable shape and size as would be known in the art.

Figure 2A:
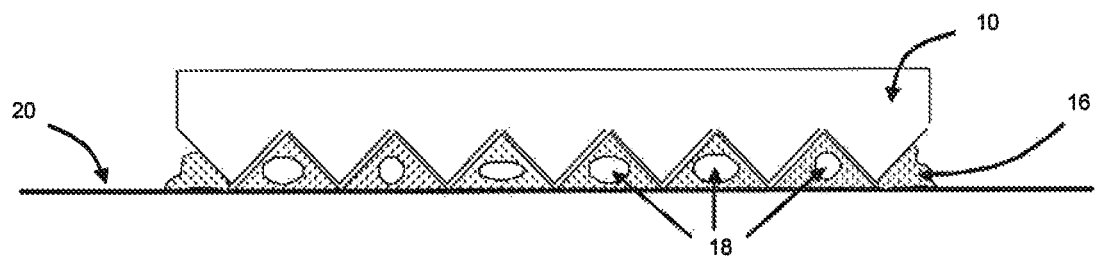
FIGS. 2A and 2B schematically illustrate a method for applying an adhesive composition in accordance with the present disclosure.
Figure 2B:
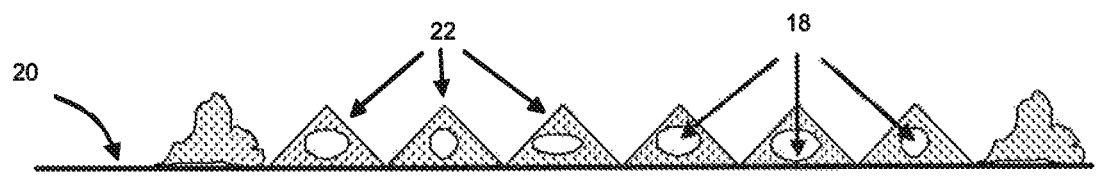

Referring to FIGS. 2A and 2B, as the trowel blade 10 spreads an adhesive composition 16 of the present disclosure, comprised of a plurality of spacer particles 18, across the surface of a substrate 20, the composition forms ridges 22 that generally take the shape of the gaps 14 between teeth 12. Substrate 20 can be any surface as would be known in the art, such as subfloors (including, but not limited to, concrete, plywood, particle or chip board, vinyl and ceramic tile, cement backer board, gypsum patch/underlayments, cement patch/underlayments, radiant-heat flooring, and terrazzo), walls, or the like.

Figure 3:
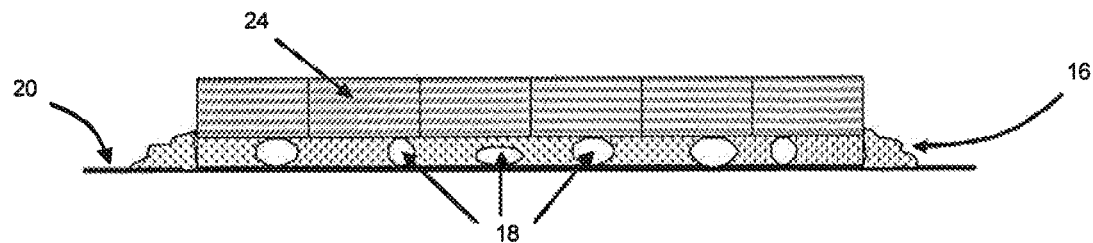
FIG. 3 illustrates a cross-section of a floor structure made with an adhesive composition in accordance with the present disclosure.

As illustrated in FIG. 3, upon application of a floor covering 24, and then upon application of sufficient pressure to the top of floor covering 24, the composition 16 spreads evenly across the portion of the substrate 20 that previously received very little of the composition. In this manner, a continuous membrane of essentially uniform thickness is formed, the thickness of which is regulated by the size of spacer particles 18.

Turning now to compositions suitable for use in connection with the present disclosure, certain compositions have been developed that allow for one-step application using the application methods previously discussed.

The adhesive composition comprises a moisture curable polymer system, such as polyurethanes, silylated polyurethanes, or other silylated polymers such as silylated polyethers that are commercially available from Kaneka Corporation. The polymer system can comprise between about 10 to about 50 weight percent of the overall composition.

In a preferred embodiment, a moisture-cure polyurethane composition has been developed, which comprises isocyanates in an amount of about 2 to about 10 weight percent, preferably between about 3 to about 5 weight percent. Useful isocyanates include aliphatic, cycloaliphatic, arylaliphatic, heterocyclic or aromatic polyisocyanate, or mixtures thereof. Examples include aliphatic diisocyanates, such as hexamethylene diisocyanate, and cycloaliphatic diisocyanates, such as isophorone diisocyanate. More preferred isocyanates are those that are aromatic, such as TDI (toluene diisocyanate) and MDI (diphenylmethane diisocyanate). The isocyanates can be monomeric or polymeric and otherwise modified. Examples of monomeric isocyanates include 4,4' diphenylmethane diisocyanate, 2,4' diphenylmethane diisocyanate, and allophanate-modified 4,4'-diphenylmethane diisocyanate. Examples of polymeric isocyanate include aromatic isocyanates that are based on diphenylmethane diisocyanate.

The adhesive composition also comprises isocyanate-reactive compounds, preferably polyols. The term polyol as used herein includes any organic compound having on average more than one and preferably at least about two, isocyanate-reactive hydroxyl moieties. Commonly used polyols are typically described as being either polyester or polyether, with other options existing, such as polybutadiene polyols and natural oil polyols, and can vary in average molecular weight from less than 300 to as much as 20,000. It is particularly preferred that one or more liquid polyols be utilized.

Preferably at least one polyether polyol that includes a propylene oxide end capped triol or diol is used. It is also preferred that the triol have a molecular weight of from about 4000 to 4500 and the diol or combination of diols have a weight average molecular weight from 1900 to 2200. These compounds can be used in combination or alone, in the amounts ranging from about 3 to 20 percent by weight.

The adhesive composition also comprises about 0.2 to about 10 weight percent of a plurality of spacer particles 18, to control the minimum thickness of the adhesive layer and prevent excessive "squeeze out" upon application of the floor covering. The spacer particles 18 can be present in the formulation from about 0.2 to about 10 weight percent, preferably about 0.5 to about 4 weight percent, more preferably from about 0.5 to about 2 weight percent. The spacer particles are between about 0.5 mm to 10 mm in size, preferably between about 0.5 mm and 5 mm in size, and most preferably between about 0.5 mm and 1.5 mm in size. The "size" is determined by the classification of a spacer particle passing through a given mesh screen in accordance with ASTM method D1921-01 and as illustrated in Table 1.

Materials that are useful as spacer particles include any that are crush-resistant and do not break or deform more than 25% from their original shape under the intended floor covering installation pressures. These could include various types of rubber, such as EPDM (ethylene propylene diene monomer) or SBR (styrene-butadiene rubber), or other elastomeric polymers, glass, metal, or minerals. The ability of a material to meet this requirement may be dependent on the size and shape chosen.

The spacers 18 may be of any non-spherical geometric shape. Examples include conical-, polygonal- (cubes, pentagons, hexagons, octagons, and the like), and polyhedral-shaped particles, as well as irregular shaped particles, as well as non-uniform particles having, for example circular, elliptical, oval, square, rectangular, triangular or polygonal cross sections found at least partially therein. "Non-uniform" and "irregular" shaped particles refer to three dimensional shapes wherein at least two different cross sections taken therethrough have different areas. Preferred shapes include irregular random shaped ground particles.

The size of the spacers 18 can be determined by the desired thickness of the cured elastomeric adhesive layer that bonds the floor covering 24 to the substrate 20. For installation of floor coverings, this thickness may be between 0.5 and 10 mm, preferably between 1 mm and 2 mm. A preferred embodiment utilizes irregularly and randomly shaped ground ethylene propylene diene monomer (EPDM) rubber, having a bulk density of around 545-673 kg/m$^3$ (34-42 lbs/ft$^3$), a durometer (Shore A) of around 50-70, with a particle size of between 0.5 mm and 10 mm, more preferably between 0.5 mm and 5 mm, and most preferably between 0.5 mm and 1.5 mm. The irregular shapes of the spacer particles 18 reduce the undesirable characteristic of the floor covering to slide or shift during installation. A typical particle size distribution (% retained) for the preferred ground EPDM particles can be found in Table I.

TABLE I

| Screen Size mm | Mesh | 0.5-1.5 mm | 1-3 mm | 1-4 mm | 1-5 mm |
|---|---|---|---|---|---|
| 4.75 | 4 | — | — | — | 0-5% |
| 4.00 | 5 | — | — | 0-5% | — |
| 3.35 | 6 | — | 0-15% | — | 20-40% |
| 2.36 | 8 | — | — | 60-80% | 40-55% |
| 2.00 | 10 | 0-5% | 60-85% | 5-20% | 0-15% |
| 1.18 | 16 | 60-85% | — | — | 0-15% |
| 1.00 | 18 | — | 10-30% | 5-20% | — |
| 0.85 | 20 | 10-30% | — | — | — |
| Pan | — | 0-15% | 0-5% | 0-5% | 0-2% |

The adhesive composition may include additional components to improve processing of the batch formulation or the performance characteristics of the final product, and are well known to those skilled in the art. Without limitation, these additional components may include plasticizers, rheological modifiers, fillers, diluents, adhesion promoters, tackifying resins, fungicides/biocides, catalysts, moisture scavengers, antioxidants, defoamers, pigments, ultraviolet absorbers and stabilizers, lubricants, extenders, and combinations thereof.

Plasticizers can be present in an amount of about 5 to about 10 weight percent, preferably, about 6 to about 8 weight percent. The plasticizer should be essentially free of water, inert to isocyanate groups, and compatible with the polymer(s). Typical plasticizers are derivatives of benzoic acid or phthalic acid (dialkyl and alkyl phthalates, such as dibutyl, dioctyl, dicyclohexyl, diisooctyl, diisodecyl, dipropylheptyl, dibenzyl or butylbenzyl phthalate). Also used are terephthalates, preferably di (2-ethylhexyl) terephthalate (DEHT), or dioctyl terephthalate (DOTP). Other types include 1, 2-cyclohexane dicarboxylic acid diisononyl ester, and alkylsulphonic phenyl esters. The plasticizers can give rheological properties to the composition and disperse the polymer system in the final composition.

Typical fillers and other rheological modifiers include talc, calcium carbonate, clay, silica, mica, wollastonite, feldspar, aluminum silicate, alumina, hydrated alumina, glass microspheres, ceramic microspheres, thermoplastic microspheres, baryte, and polyamide waxes. These additives can have a wide variety of particles sizes. Particularly useful are coated and uncoated calcium carbonates, which can be either ground or precipitated, at a loading up to 80 weight percent of the formulation by weight, preferably about 30 to about 75 weight percent, more preferably about 45 to about 70 weight percent. Examples include a 0.15 micron mean particle size, coated, precipitated calcium carbonate, and a 3 micron mean particle size, uncoated, ground calcium carbonate. These fillers are used in sufficient amount to increase the strength of the composition and to provide thixotropic properties.

Suitable diluents include heavy alkylate naphtha, isoparaffinic solvents, odorless mineral spirits, and propylene carbonate, and can be present in an amount up to about 10 weight percent, and preferably up to about 8 weight percent. The diluents assist in providing the desired viscosity of the composition.

Suitable adhesion promoters include silane containing compounds, which may additionally contain at least one reactive group, such as epoxy, isocyanate, amine groups and preferably comprise epoxy reactive groups. Adhesion promoters can be present in an amount up to about 1 weight percent.

It is frequently desirable to include a catalyst in the formulation. Any of the catalysts conventionally employed in the art to catalyze the reaction of an isocyanate with a reactive hydrogen-containing compound can be employed for this purpose. Such catalysts include organic and inorganic acid salts of, and organometallic derivatives of, bismuth, lead, tin, iron, antimony uranium, cadmium, cobalt, thorium, aluminum, mercury, zinc, nickel cerium, molybdenum, vanadium, copper, manganese, and zirconium, as well as tin carboxylates, organo silicon titanates, alkyl titanates, bismuth carboxylates, and dimorpholinodiethyl ether or alkyl-substituted dimorpholinodiethyl ethers, and phosphines and tertiary organic amines. Still other catalysts include bismuth octoate, dimorpholinodiethyl ether and (di-(w-(e,t-dimethylmorpholino)ethyl)) ether. Representative organotin catalysts are stannous octoate, stannous oleate, dibutyltin dioctoate, and dibutyltin dilaurate. The catalyst content can range from about 0.1 to about 1 weight percent.

A preferred embodiment of the composition in accordance with the invention comprises an antimicrobial agent capable of protecting the composition from the multiplication of bacteria and fungi in the wet and the dry state. Acceptable antimicrobial agents include zinc pyrithione, N-(trichloromethylthio) phthalimide, and carbendazim. These materials can be present in the formulation at about 0.01 to about 0.2 weight percent.

Moisture scavenger compounds include calcium oxide, molecular sieves, and para-toluenesulfonyl isocyanate, can be present in the formulation from about 0.1 to about 1 weight percent.

Useful antioxidant compounds consist of pentaerythritol tetrakis 3-(3', 5'-di-tert-butyl-4'-hydroxyphenyl propionate) and thiodiethylene bis 3-(3,5-di-ter-butyl-4-hydroxyphenyl) propionate. These compounds can be present in the formulation from about 0.01 to about 0.1 weight percent.

The adhesive composition can be manufactured in a single, high intensity batch mixer, and is commonly known in the art. All of the raw materials are sequentially charged. Combinations of mechanical, thermal, and chemical desiccation methods are used to remove excess moisture from the product to prevent premature curing. Process temperatures and times are controlled as necessary, depending on the nature of the raw materials and whether the prepolymer is added as an intermediate or reacted in-situ during the manufacture of the final composition.

The following examples in Table II are set forth to describe the adhesive in further detail. The examples should not be construed as limiting the floor adhesive composition in any manner. All raw material numbers are measured in parts per hundred (pph).

The adhesive compositions were tested at least one week after date of manufacture to determine its Brookfield viscosity at ambient conditions (about 21° C., or 70° F.), using an HA torque Brookfield DV-11+ Pro viscometer, with a #6 spindle at a speed of 2.5 rpm.

A thin film of adhesive was laid out and cured for one week at ambient conditions, and tested for mechanical properties (tensile strength, elongation at failure, and 100% modulus) per ASTM D-412.

The hardness of the cured adhesive composition was measured per ASTM D2240. Samples were allowed to cure at ambient conditions for one week, and then heat aged for one more week at 60° C. (140° F.).

Lap shear specimens were assembled and tested per ASTM D1002: 25 mm×25 mm (1 in×1 in) overlap, cured for one week at room temperature, and then heat aged for one more week at 60° C. (140° F.). Different substrates were used: oak to oak; oak to concrete.

A slip test was developed to determine the amount of force required to induce movement of a floor covering on top of an adhesive layer during installation. An adhesive was applied to a substrate, such as cement board, per the adhesive manufacturer's specified method: the Example 2 adhesive (with and without spacers) utilized a 6.9 mm×6.9 mm (¼ inch×¼ inch) V-notch trowel; the Bostik SilentStik™ adhesive, containing 1-7 mm spherical particles, used a special notched applicator (model 07.07.694), having a notch height of 12 mm, with the notches evenly spaced apart by a distance of 40 mm. Two pieces of hardwood floor (oak), having dimensions of 6.35 cm×20.3 cm (2.5 in.×8 in.), were applied on top of the adhesive, such that the long edges were adjacent to each other. A push-pull gauge, for example, an Amatex Chatillon type 516 Force Gauge, was used to impart a horizontal force that is perpendicular to the long edge. The amount of force required to induce movement of the hardwood floor was recorded, and the data are listed in Table III. If the hardwood floor shifts too easily during installation, then the entire floor may become improperly aligned and may appear to be crooked. Therefore, it is desirable that the adhesive have sufficient initial green strength to hold the floor board in place until the adhesive has cured (ie. a higher force required to induce movement is preferred).

The data in Table III show irregular shaped spacer particles significantly increase the force required to cause slippage as compared to spherical spacer particles of the same size or using no particles at all. Table III shows that four times more force is required to cause slippage when using irregular shaped spacer particles than when 1.5 mm spherical particles, or when no particles, are used. Further, eight times more force is required to cause slippage when using irregular shaped spacer particles than when SilentStik™ spherical particles are used.

TABLE II

| Ingredients [pph] | Example 1 | Example 2 | Example 3 | Example 4 |
|---|---|---|---|---|
| Polyether polyol (triol) | 11.1 | 10.3 | | |
| Polyether polyol (diol) | 6.9 | 6.3 | | |
| MS Polymer | | | 20.3 | |
| SPS Polymer | | | | 22.9 |
| Tackifying resin | | 7.4 | | |
| Calcium carbonate (uncoated) | 57.5 | 53.1 | 64.0 | 63.6 |
| Calcium carbonate (coated) | 5.8 | 5.3 | | |
| Plasticizer | 8.0 | 7.4 | 12.9 | 12.7 |
| MDI (4,4' and 2,4' mixture) | 2.5 | 2.3 | | |
| MDI (4,4' MDI) | 1.9 | 1.8 | | |
| Diluent | 4.0 | 3.7 | | |
| Titanium Dioxide | | | 0.8 | |
| Adhesion promoter | | | 0.6 | 0.4 |
| Fumed silica | | | 0.5 | |
| Desiccant | 0.1 | 0.1 | 0.5 | 0.2 |
| Tin catalyst | 0.2 | 0.2 | 0.4 | 0.2 |
| Antimicrobial agent | 0.1 | 0.1 | | |

TABLE II-continued

| Ingredients [pph] | Example 1 | Example 2 | Example 3 | Example 4 |
|---|---|---|---|---|
| Irganox 1010 | 0.02 | 0.02 | | |
| Irganox 1035 | 0.02 | 0.02 | | |
| Irregular spacers | 1.9 | 1.9 | | |
| Spherical spacers | | | 1.5 | |
| Total | 100.0 | 100.0 | 101.5 | 100.0 |
| Mechanical testing | | | | |
| Tensile strength [psi] | 154 | 146 | 153 | 145 |
| Elongation [%] | 432 | 559 | 236 | 337 |
| 100% modulus | 100 | 63 | 111 | 122 |
| Hardness | | | | |
| Shore A | 52 | 36 | 42 | 45 |
| Shore A (heat aged) | 50 | 35 | 47 | 50 |
| Lap shear [psi] | | | | |
| oak/oak | 87 | 130 | 165 | 147 |
| oak/oak (heat aged) | 130 | 152 | 219 | n/a |
| oak/concrete | 93 | 134 | 128 | n/a |
| oak/concrete (heat aged) | 136 | 142 | 166 | n/a |
| Brookfield viscosity [poise] | 793 | 653 | 336 | n/a |

TABLE III

| | Example 2 (without spacers) | Example 2 (1.5 mm irregular spacers) | Example 2 (1.5 mm spherical spacers) | Bostik SilentStik ™ (1-7 mm spherical spacers) |
|---|---|---|---|---|
| Force [lbs] | 0.5 | 2 | 0.5 | 0.25 |

Acoustical sound data were determined via two methods. One test method is in accordance with American Society for Testing and Materials Standard Test Method for Laboratory Measurement of Sound Transmission Through Floor-Ceiling Assemblies Using the Tapping Machine—Designation E 492-04/E 989-06. The uncertainty limits of each tapping machine location met the precision requirements of section A1.4 of ASTM E 492-09. Specimen description: 152 mm (6 inch) concrete slab overlaid with engineered wood planks adhered with adhesive. The test specimen was a floor-ceiling assembly consisting of the following:

1 layer of 9.8 mm (0.385 in.) Bruce engineered hardwood flooring ID: ER 3555. Samples were 172 mm (5 in.) wide, by 1499 mm (59 in.) long planks. Sample weight was 8.1 kg/m² (1.66 lbs/ft²).

1 layer of adhesive. Sample was troweled on using 6.9 mm×6.9 mm (¼ inch×¼ inch) V-notch trowel 6 mil poly sheeting attached to concrete with double sided tape at seams and perimeter.

152.4 mm (6 in.) thick reinforced concrete slab of density 366.1 kg/m² (75.0 lbs/ft²).

The overall density of the test assembly was 374.3 kW (76.66 lbs/ft²).

The test floor size was 3658 mm×4877 mm (12 ft×16 ft)

Conditioning: The concrete cured a minimum of 28 days. The adhesive cured for minimum of 24 hours.

The second test method is in accordance with American Society for Testing and Materials Standard Test Method for Laboratory Measurement of Effectiveness of Floor Coverings in Reducing Impact Sound Transmission through Concrete Floors—Designation E 2179-03. The materials and test specimen are identical to that previously described.

Both methods measure acoustical performance as impact Insulation Class (IIC). IIC is a single number rating that characterizes the ability of the floor ceiling assembly to reduce impact noise. Higher values mean better reduction. The scale is logarithmic, so small changes in IIC can mean significant differences in the level of impact noise. ASTM E 2179 also calculates a ΔIIC, which consists of two IIC tests: one test is over the bare concrete subfloor (no flooring materials), and the other is over the concrete subfloor with floor covering materials. The LAIC, or improvement of impact sound insulation, is obtained by subtracting the reference bare floor from the IIC of the whole assembly, and as illustrated by the data in Table VI, results in a 23 decibel (dB) noise reduction in the system tested. It is believed that the improvement in noise abatement is a result of the present composition providing a continuous and uniform coverage so that there is always a minimum adhesive thickness between the floor substrate and the floor covering element, which prevents direct contact between the floor substrate and the floor covering element, in combination with the irregularly shaped, non-spherical spacer particles which randomly deflect sound waves attempting to pass through the adhesive composition.

Results for 152 mm (6 in.) concrete slab overlaid with engineered wood flooring with Example 2, per ASTM E 2179-03 are indicated in Table IV.

TABLE IV

| Source room | Receiving room |
|---|---|
| | Volume [m³]: 63.9 |
| Rm Temp [° C.]: 16 | Rm Temp [° C.]: 16.5 |
| Humidity [%]: 38 | Humidity [%]: 67 |

Impact Insulation Class IIC [dB]: 52
Sum of Unfavorable Deviations [dB]: 30
Max. Unfavorable Deviation [dB]: 8 at 250 Hz

| Frequency [Hz] | $L_n$ [dB] | L2 [dB] | D [dB/s] | Corr. [dB] | u. Dev. [dB] | $\Delta L_n$ |
|---|---|---|---|---|---|---|
| 50 | 58 | 64.9 | 13.13 | −6.9 | | 2.24 |
| 63 | 53 | 58.2 | 19.36 | −5.2 | | 1.79 |
| 80 | 58 | 64.2 | 13.53 | −6.2 | | 1.78 |
| 100 | 61 | 67.5 | 14.64 | −6.5 | 1 | 2.88 |
| 125 | 60 | 65.6 | 3.46 | −5.6 | | 2.13 |
| 160 | 64 | 70.2 | 4.01 | −6.2 | 4 | 2.14 |
| 200 | 64 | 69.6 | 3.66 | −5.6 | 4 | 1.15 |
| 250 | 68 | 72.8 | 3.06 | −4.8 | 8 | 0.60 |
| 315 | 64 | 68.4 | 3.12 | −4.4 | 4 | 0.43 |
| 400 | 62 | 66.7 | 2.89 | −4.7 | 3 | 0.49 |
| 500 | 61 | 65.3 | 2.81 | −4.3 | 3 | 0.41 |
| 630 | 60 | 64.4 | 2.7 | −4.4 | 3 | 0.37 |
| 800 | 55 | 59.4 | 2.61 | −4.4 | | 0.39 |
| 1000 | 49 | 52.6 | 2.41 | −3.6 | | 0.20 |
| 1250 | 44 | 47.4 | 2.14 | −3.4 | | 0.20 |
| 1600 | 38 | 41.3 | 2.00 | −3.3 | | 0.15 |
| 2000 | 33 | 35.6 | 1.86 | −2.6 | | 0.36 |
| 2500 | 29 | 30.9 | 1.71 | −1.9 | | 0.17 |
| 3150 | 27 | 29.2 | 1.54 | −2.2 | | 0.15 |
| 4000 | 26 | 27.3 | 1.38 | −1.3 | | 0.16 |
| 5000 | 23 | 24.1 | 1.21 | −1.1 | | 0.20 |

$L_n$ = Normalized Sound Pressure Level, dB
L2 = Receiving Room Level, dB
D = Decay Time, dB/second
$\Delta L_n$ = Uncertainty for 95% Confidence Level Results for bare 152 mm (6 in.) concrete slab per ASTM E 2179-03 are indicated in Table V.

TABLE V

| Source room | | Receiving room | | | |
|---|---|---|---|---|---|
| Rm Temp [° C.]: 16 | | Volume [m³]: 63.9 | | | |
| Humidity [%]: 38 | | Rm Temp [° C.]: 16.5 | | | |
| | | Humidity [%]: 67 | | | |

| Frequency [Hz] | $L_n$ [dB] | L2 [dB] | D [dB/s] | Corr. [dB] | u. Dev. [dB] | $\Delta L_n$ |
|---|---|---|---|---|---|---|
| 50 | 30 | 32.9 | 12.10 | 27.1 | | 2.3 |
| 63 | 57 | 32.8 | 18.59 | 24.2 | | 2.5 |
| 80 | 57 | 31.7 | 14.65 | 25.3 | | 2.4 |
| 100 | 64 | 33.2 | 16.05 | 30.8 | | 3.3 |
| 125 | 66 | 39.4 | 15.19 | 26.6 | | 2.3 |
| 160 | 67 | 33.1 | 14.78 | 33.9 | | 2.3 |
| 200 | 70 | 29.2 | 16.94 | 40.8 | | 0.8 |
| 250 | 71 | 27.8 | 18.81 | 13.2 | | 1.0 |
| 315 | 67 | 25.8 | 19.14 | 21.2 | | 0.7 |
| 400 | 70 | 37.3 | 20.75 | 32.7 | | 0.3 |
| 500 | 68 | 35.3 | 20.98 | 32.7 | | 0.4 |
| 630 | 70 | 35.7 | 22.15 | 34.3 | | 0.3 |
| 800 | 70 | 27.7 | 21.92 | 42.3 | | 0.2 |
| 1000 | 71 | 21.1 | 23.86 | 49.9 | | 0.2 |
| 1250 | 72 | 18.8 | 27.15 | 53.2 | | 0.3 |
| 1600 | 72 | 18.1 | 28.66 | 53.9 | | 0.2 |
| 2000 | 72 | 17.4 | 30.85 | 54.6 | | 0.1 |
| 2500 | 74 | 18.1 | 33.71 | 55.9 | 4 | 0.2 |
| 3150 | 75 | 16.6 | 37.83 | 58.4 | 8 | 0.4 |
| 4000 | 77 | 13.8 | 44.09 | 63.2 | | 0.6 |
| 5000 | 76 | 11.5 | 50.03 | 64.5 | | 0.8 |

$L_n$ = Normalized Sound Pressure Level, dB
L2 = Receiving Room Level, dB
D = Decay Time, dB/second
$\Delta L_n$ = Uncertainty for 95% Confidence Level Results for ΔIIC testing per ASTM E 2179-03 (effectiveness of floor coverings in reducing impact sound transmission through concrete floors) are shown in Table VI.

TABLE VI

Increase in Impact Insulation Class ΔIIC = 23.0 dB

| Frequency [Hz] | $L_0$ [dB] | $L_c$ [dB] | $L_d$ [dB] | $L_{ref}$ [dB] | $L_{ref,c}$ [dB] |
|---|---|---|---|---|---|
| 100 | 64 | 61 | 3 | 67.0 | 64.0 |
| 125 | 66 | 60 | 6 | 67.5 | 61.5 |
| 160 | 67 | 64 | 3 | 68.0 | 65.0 |
| 200 | 70 | 64 | 6 | 68.5 | 62.5 |
| 250 | 71 | 68 | 3 | 69.0 | 66.0 |
| 315 | 67 | 64 | 3 | 69.5 | 66.5 |
| 400 | 70 | 62 | 8 | 70.0 | 62.0 |
| 500 | 68 | 61 | 7 | 70.5 | 63.5 |
| 630 | 70 | 60 | 10 | 71.0 | 61.0 |
| 800 | 70 | 55 | 15 | 71.5 | 56.5 |
| 1000 | 71 | 49 | 22 | 72.0 | 50.0 |
| 1250 | 72 | 44 | 28 | 72.0 | 44.0 |
| 1600 | 72 | 38 | 34 | 72.0 | 38.0 |
| 2000 | 72 | 33 | 39 | 72.0 | 33.0 |
| 2500 | 74 | 29 | 45 | 72.0 | 27.0 |
| 3150 | 75 | 27 | 48 | 72.0 | 24.0 |

$L_0$ = Normalized Sound Pressure Level for Bare Standard Concrete Floor, dB
$L_c$ = Normalized sound pressure level for covering over concrete floor, dB
$L_d = L_0 - L_c$, dB
$L_{ref}$ = Reference floor average normalized impact sound pressure level, dB
$L_{ref,c} = L_{ref} - L_d$, dB Results for 152 mm (6 in.) concrete slab including suspended gypsum board ceiling, overlaid with engineered wood flooring with Example 2 per ASTM E 492-09 are indicated in Table VII.

TABLE VII

| Source room | Receiving room |
|---|---|
| | Volume [m³]: 60 |
| Rm Temp [° C.]: 16.5 | Rm Temp [° C.]: 18 |
| Humidity [%]: 33 | Humidity [%]: 65 |

Impact Insulation Class IIC [dB]: 71
Sum of Unfavorable Deviations [dB]: 28
Max. Unfavorable Deviation [dB]: 8 at 100 Hz

| Frequency [Hz] | $L_n$ [dB] | $L_2$ [dB] | D [dB/s] | Corr. [dB] | u. Dev. [dB] | $\Delta L_n$ |
|---|---|---|---|---|---|---|
| 100 | 49 | 52.0 | 293 | -3.0 | 8 | 1.48 |
| 125 | 48 | 54.5 | 21.7 | -6.5 | 7 | 3.27 |
| 160 | 46 | 51.5 | 18.0 | -5.5 | 5 | 2.20 |
| 200 | 44 | 49.4 | 18.4 | -5.4 | 3 | 0.77 |
| 250 | 43 | 48.2 | 18.2 | -5.2 | 2 | 0.76 |
| 315 | 40 | 44.8 | 18.8 | -4.8 | | 0.82 |
| 400 | 38 | 45.3 | 18.6 | -7.3 | | 0.40 |
| 500 | 36 | 42.6 | 19.5 | -6.6 | | 0.24 |
| 630 | 37 | 43.1 | 21.8 | -6.1 | | 0.43 |
| 800 | 32 | 37.3 | 21.6 | -5.3 | | 0.44 |
| 1000 | 30 | 34.7 | 23.4 | -4.7 | | 0.27 |
| 1250 | 30 | 34.0 | 25.7 | -4.0 | | 0.33 |
| 1600 | 28 | 31.9 | 27.0 | -3.9 | | 0.31 |
| 2000 | 26 | 29.1 | 30.6 | -3.1 | | 0.38 |
| 2500 | 24 | 27.0 | 33.7 | -3.0 | | 031 |
| 3150 | 24 | 26.8 | 35.8 | -2.8 | 3 | 0.20 |
| 4000 | 24 | 25.6 | 40.2 | -1.6 | | 0.29 |
| 5000 | 21 | 22.2 | 45.2 | -1.2 | | 0.30 |

$L_n$ = Normalized Sound Pressure Level, dB
$L_2$ = Receiving Room Level, dB
D = Decay Time, dB/second
$\Delta L_n$ = Uncertainty for 95% Confidence Level Although the present invention has been described in considerable detail with reference to certain preferred versions thereof, other versions are possible. Therefore, the spirit and scope of the appended claims should not be limited to the description of the preferred version contained herein.

We claim:

1. An adhesive composition, comprising:
   a. 10 to 50 weight percent of a moisture curable polymer system;
   b. 0.2 to 10 weight percent of a plurality of spacer particles, wherein said particles are irregularly shaped and between 0.5 to 10 mm in size and comprise an elastomeric material selected from the group consisting of at least one of ethylene-propylene-diene monomer and styrene-butadiene rubber; and
   c. 40 to 80 weight percent of additives for modifying physical properties of the composition.

2. The composition of claim 1, wherein said moisture curable polymer system is selected from the group consisting of polyurethanes, silylated polyurethanes, and silylated polyethers.

3. The composition of claim 2, wherein said moisture curable polymer system further comprises 3 to 20 weight percent of an isocyanate-reactive compound.

4. The composition of claim 1 wherein said additives are selected from the group consisting of plasticizers, rheological modifiers, fillers, diluents, adhesion promoters, tackifying resins, fungicides/biocides, catalysts, moisture scavengers, antioxidants, defoamers, pigments, ultraviolet absorbers and stabilizers, lubricants, extenders, and combinations thereof.

5. The composition of claim 1 wherein said spacer particles are between 0.5 mm and 1.5 mm in size.

6. A floor structure, comprising:
a. a floor substrate;
b. an adhesive composition comprising a moisture-curable polymer system and a plurality of irregularly shaped spacer particles between 0.5 to 10 mm in size, applied to at least a portion of said floor substrate; and
c. at least one floor covering element applied over said adhesive.

7. The floor structure of claim 6, wherein said polymer system is selected from the group consisting of polyurethanes, silylated polyurethanes, and silylated polyethers.

8. The floor structure of claim 7, wherein said floor substrate is chosen from the group consisting of concrete, plywood, particle board, chip board, vinyl tile, ceramic tile, cement backer board, gypsum, radiant-heat flooring, and terrazzo.

9. The floor structure of claim 8, wherein said floor covering is selected from the group consisting of engineered wood, solid wood, bamboo, ceramic tile, marble, and stone.

10. A method for constructing a structure, comprising the steps of:
a. applying an adhesive composition comprising a one-component moisture curable polymer system and a plurality of irregularly shaped spacer particles between 0.5 to 10 mm in size, to at least a portion of a surface of a first substrate;
b. applying a second substrate over said composition; and
c. applying pressure, causing said composition to spread uniformly across the portion of said first substrate, thereby creating a continuous adhesive layer.

11. The method of claim 10 wherein said polymer system is selected from the group consisting of polyurethanes, silylated polyurethanes, and silylated polyethers.

12. The method of claim 10, wherein said first substrate is a floor substrate.

13. The method of claim 12, wherein said floor substrate is chosen from the group consisting of concrete, plywood, particle board, chip board, vinyl tiles, ceramic tile, cement backer board, gypsum, radiant-heat flooring, and terrazzo.

14. The method of claim 13, wherein said second substrate is selected from the group consisting of engineered wood, solid wood, bamboo, ceramic tile, marble, and stone.

15. The method of claim 10, wherein the first substrate is a wall.

* * * * *